Patented Sept. 27, 1938

2,131,127

UNITED STATES PATENT OFFICE 2,131,127

VULCANIZATION OF RUBBER

William P. ter Horst, Silver Lake, Ohio, assignor to United States Rubber Company, New York, N. Y., a corporation of New Jersey No Drawing. Application September 18, 1933, Serial No. 690,023

7 Claims. (Cl. 18—53)

This invention relates to the art of vulcanizing rubber, particularly, to the vulcanization of rubber in a short time and at low temperatures.

Rubber technologists have striven for years to reduce the time and the temperature of vulcanization, both for the purpose of producing a better quality of rubber and in order to increase the output of their vulcanizing equipment. With this end in view, numerous vulcanization accelerators have been developed, some of them being so active that vulcanization is complete in a few days at room temperatures or in a few minutes at temperatures above the boiling point of water. However, the accelerators which have heretofore been proposed, if sufficiently active to enable a substantial reduction in vulcanization time or temperature, are so active that the heat developed in the mixing or forming of the rubber composition is sufficient to institute vulcanization, the composition being said to "scorch".

As is well known, the mercaptoarylenethiazoles; e. g., 1-mercaptobenzothiazole, are valuable rubber vulcanization accelerators, but they suffer from the defect of acting at a low temperature; so that when a rubber mix is made in the ordinary way by incorporating together the ingredients on the mill, there is a great risk that prevulcanization, or scorching, will take place unless special precautions are taken. Various efforts have been made to overcome this disadvantage. Thus it has been proposed to use a variety of different chemical derivatives of 1-mercaptoarylenethiazoles or to use a 1-mercaptoarylenethiazole in conjunction with acidic substances, but the results of all these efforts exhibit some defect.

This invention provides a method of vulcanizing rubber in a short time and/or at relatively low temperatures in the presence of accelerators having a tendency to produce pre-vulcanization, among them the mercaptoarylenethiazoles mentioned above, without giving rise to scorching during the mixing or other operations preliminary to vulcanization. It makes possible a new and improved method of vulcanization characterized by a freedom from pre-vulcanization, even in the presence of the mercapto arylene thiazoles, and gives rise to vulcanized rubber compositions of good ageing and other properties.

Briefly stated, the invention involves the use as accelerators of vulcanization with or without other known accelerators of polybasic organic acid salts of amino bodies such, for example, as the amidines. For purposes of illustration, the invention will be described with reference to the use, with 1-mercaptobenzothiazole and certain of its derivatives, of the guanidine salts of certain poly-carboxylic organic acids. Although in the practice of the invention these salts are preferably employed in conjunction with thiazyl sulfide accelerators, it will be understood that other known accelerators may be used in place of the thiazyl sulfides. Inasmuch as these salts are themselves accelerators, it will be understood that the use of accelerators other than the salts hereinbelow described is not strictly necessary. It will also be understood that, in general, any such amino-body salt of a poly-basic organic acid which in the presence of zinc oxide and sulphur is unstable at vulcanization temperature is useful in the practice of the invention.

The materials of the present invention are well adapted to be used with 1-mercaptobenzothiazole or its derivatives. When so used, they speed vulcanization, but do not occasion the premature vulcanization in the mill caused by practically all free amines when used with 1-mercaptobenzothiazole. Moreover, the compounds of the invention enable 1-mercaptobenzothiazole to be used at higher vulcanization ranges, up to about 45 pounds of steam pressure. In one sense, the materials of the present invention may be said to have the effect of taming 1-mercaptobenzothiazole on the mill and activating it in the mold. The rubber after vulcanization has the so-called snappy quality of rubber obtainable under conditions of low temperature vulcanization.

While the invention is not to be understood to be limited by any theories expressed herein, it is believed that one reason for the excellent activating properties of the amino-body salts of polybasic organic acids is the ease with which they decompose at, or near, vulcanization temperatures. The diphenyl guanidine salts of stearic, acetic and benzoic acids, are relatively stable. They do not decompose readily and are thus inferior for the purposes of this invention to the amino-body salts of the poly-basic organic acids.

Example 1

Diphenylguanidine acid oxalate may be prepared by dissolving 12.8 grams of oxalic acid, $(COOH)_2.2H_2O$, in 300 grams water and adding, at a temperature exceeding 80 degrees C., 21 grams diphenylguanidine. The temperature is gradually raised to boiling, the diphenylguanidine meanwhile going into solution in the form of the acid oxalate. The solution is then filtered to separate a small amount of water-insoluble material which is present and the filtrate is allowed to cool. Diphenylguanidine acid oxalate separates out and is filtered, washed and dried. The product so obtained is a white powder melting at approximately 168 degrees C. with decomposition.

For test purposes, a rubber mix was used comprising smoked sheets, 100 parts; sulphur, 3 parts; zinc oxide, 5 parts, and stearic acid, 1 part. Two mixes were made, one of which, the control, contained one part of 1-mercaptobenzothiazole as the accelerator and the other 0.3 part of 1-mercaptobenzothiazole and 0.7 part of diphenylguanidine acid oxalate. A scorch test showed that the stock containing one part of 1-mercaptobenzothiazole scorched after running in the mill five hours at 80 degrees C., whereas eleven hours at 80 degrees C. were required before scorching took place with the stock containing the combination of 1-mercaptobenzothiazole and diphenylguanidine acid oxalate.

The following test results, tensile strength being given in pounds per square inch, were obtained:

| Cures | Stock containing 1 part 1-mbt. | Stock containing 0.3 part 1-mbt. and 0.7 part dpg. acid oxalate |
| --- | --- | --- |
| 5 min. at 290° F | 1,350 | 1,550 |
| 7 min. at 290° F | 2,550 | 2,780 |
| 15 min. at 270° F | 2,650 | 2,725 |
| 30 min. at 270° F | 4,325 | 4,725 |

Example 2

Neutral diphenylguanidine oxalate may be prepared by adding 1 mol of diphenylguanidine to a solution of 1 mol of diphenylguanidine acid oxalate in water. The neutral diphenylguanidine oxalate is a white powder having a melting point of approximately 220–225 degrees C. with decomposition. Like the acid oxalate, it tends to reduce scorching.

Example 3

The mixed oxalate, diphenylguanidine ammonium oxalate is obtained by dissolving 252 grams of oxalic acid, $(COOH)_2.2H_2O$, in 2000 grams of water at a temperature of 80° C. and adding to this solution slowly and with stirring, 422 grams of diphenyl guanidine, meanwhile keeping the temperature at 75–80° C. The diphenyl guanidine goes into solution, forming the acid oxalate. The solution, which is strongly acid to litmus, is cooled to 60° C., whereupon 28% aqueous ammonia is added with stirring until the reaction is faintly alkaline to litmus paper. It will be found that 120 grams of the 28% ammonia (equivalent to 1 mol. are required. A precipitate forms, which after being cooled and filtered, melts with decomposition at 238–240° C. The reaction is as follows:

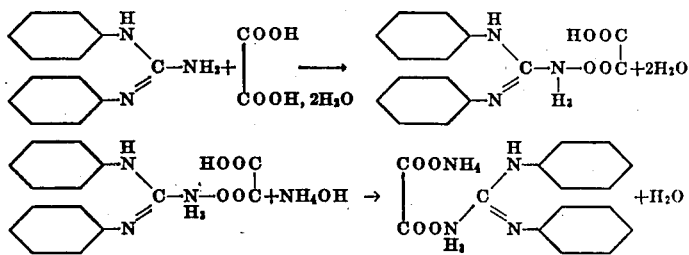

Example 4

The mixed oxalate diphenylguanidine urea oxalate is obtained when 1 mol urea is added to a hot aqueous solution of 1 mol diphenylguanidine acid oxalate. This product is a white powder which melts at approximately 168 degrees C.

Example 5

Diphenylguanidine-aniline oxalate is similarly obtained by adding 1 mol of diphenylguanidine to an aqueous solution of aniline acid oxalate or by adding 1 mol of aniline to a hot aqueous solution of diphenylguanidine acid oxalate. The product is in the form of a white powder melting at approximately 220° C. with decomposition.

Example 6

What is believed to be diphenylguanidine maleate may be prepared by dissolving 116 parts of maleic acid in 500 parts of water, and adding to the solution, at a temperature of approximately 80° C., 211 parts of diphenylguanidine. It is preferable to add the diphenylguanidine slowly and with stirring. The diphenylguanidine goes into solution, probably in the form of the acid maleate. The solution is then filtered to separate the small amount of water-insoluble material and the filtrate is allowed to cool. The product crystalizes out and after being filtered, washed and dried is obtained in a yield of 295 parts, melting at 138–140° C.

While the product is believed to be diphenyl guanidine acid maleate, it is possible that the maleic acid may have been converted, on heating, to its isomer, fumaric acid, which would give rise to the diphenyl guanidine acid fumarate.

The neutral diphenyl guanidine maleate may be similarly prepared by adding 1 mol of diphenylguanidine to a solution of 1 mol of diphenylguanidine acid maleate in water. What is believed to be the neutral diphenylguanidine maleate separates out on cooling as a white powder.

Example 7

Diphenylguanidine neutral fumarate is prepared by heating 23.2 grams of fumaric acid and 84.4 grams of diphenylguanidine in 250 cc. of alcohol to the boiling point of the alcohol. After this solution is allowed to cool and to stand for a number of hours, a substantially colorless solid separates out. This solid diphenylguanidine neutral fumarate when pulverized and dried melts with decomposition at 193° C. The yield is quantitative. The equation representing the reaction is believed to be as follows:

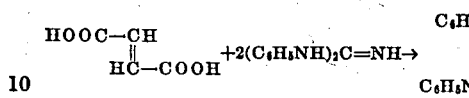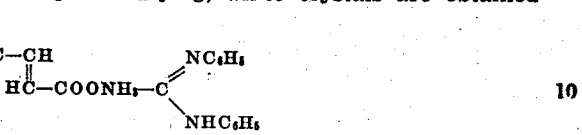

Example 8

Diphenylguanidine succinate may be prepared by dissolving 120 parts of succinic acid in 500 parts of water, adding, at a temperature of approximately 80° C., 211 parts of diphenylguanidine, preferably slowly and with stirring. The diphenylguanidine apparently goes into solution in the form of diphenylguanidine acid succinate. Upon cooling, this acid succinate separates out in the form of crystals which, after filtering, washing and drying, melts at 203–206° C., with decomposition.

Example 9

Diphenylguanidine neutral succinate may be prepared by refluxing a suspension of 23.6 grams of succinic acid and 84.4 grams of diphenylguanidine in 350 cc. of alcohol until all the material goes into solution. Upon cooling the solution and permitting it to stand for a period of time, a colorless solid, diphenylguanidine neutral succinate, separates out. After filtering and drying, the solid so obtained melts at 168–169° C. The product is in an almost theoretical yield. The equation representing the reaction is believed to be as follows:

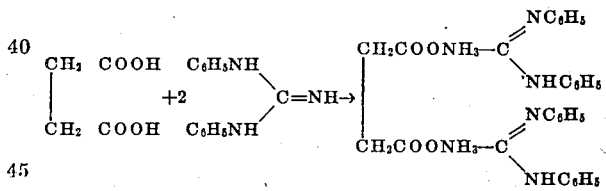

The diphenylguanidine neutral succinate may, if preferred, be prepared in an aqueous medium. In such case, a mixture of 464.5 grams of succinic acid and 1582 grams of diphenylguanidine may be added to 7000 cc. of boiling water. All goes into solution in a short time. Upon cooling, an almost colorless solid separates out which, upon being filtered and dried, melts at 158–160° C.

Example 10

In place of succinic acid, its anhydride may be used with equally successful results. Thus in the preparation of diortho tolyl guanidine neutral succinate, 1 mol of succinic anhydride is dissolved in boiling water. Two mols of diortho tolyl guanidine are added thereto with stirring, the temperature being maintained in the neighborhood of 100° C. The solution is then allowed to cool, whereupon white crystals separate out, which, after filtering and drying, melt at a temperature of 173–175° C. The equation representing the reaction is believed to be as follows:

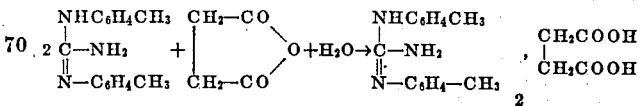

Example 11

Diortho tolyl guanidine neutral oxalate is obtained by adding 152 grams of diortho tolyl guanidine to a boiling solution of 40 grams oxalic acid, $(COOH)_2 \cdot 2H_2O$, in 1500 grams of water. Boiling is continued for 15 minutes, after which the mixture is allowed to cool. Upon filtering and drying, white crystals are obtained $$HOOC-CH\phantom{xxx} NC_6H_5$$
$$\phantom{xx}\|\phantom{xxxxxxxx}/$$
$$HC-COONH_3-C$$
$$\phantom{xxxxxxxxxxx}\backslash$$
$$\phantom{xxxxxxxxxx}NHC_6H_5$$

which melt at 226–227° C. with decomposition. Since the product is slightly soluble in boiling water, the filtrate may be concentrated to 150 cc. and then cooled and dried, whereupon a second crop of crystals melting, with decomposition, at 220–224° C. is obtained.

Example 12

Diphenyl guanidine ammonium phthalate is prepared by suspending 296 grams of phthalic anhydride in 2000 grams of water heated to a temperature of 80° C. and adding thereto 422 grams of diphenyl guanidine, the temperature meanwhile being maintained at 80° C. The mixture is cooled to 60° C. and 28% aqueous ammonia added until the reaction is faintly alkaline to litmus paper. 120 grams of the 28% ammonia (equivalent to 1 mole) are required. Upon cooling, filtering and drying, diphenyl guanidine ammonium phthalate is obtained in an excellent yield in the form of white crystals which melt with decomposition at 181–183° C.

Still other compounds which may be employed in the practice of the invention are diphenyl guanidine neutral sebacate, diphenyl guanidine ammonium phthalate, diphenyl guanidine urea phthalate, and diphenyl guanidine neutral tartrate. It will be understood that these compounds may be prepared by the processes similar to those disclosed in the preceding examples.

These amino-body salts of poly-basic organic acids may be employed in substantially any of the ordinary rubber formulae and may, if desired, be used advantageously in combination with any organic sulphur accelerator. One formula in which they have been found particularly desirable is the following:

| | Parts by weight |
|---|---|
| Smoked sheet rubber | 50 |
| Pale crepe rubber | 50 |
| Zinc oxide | 5 |
| Sulphur | 3 |
| Titanium dioxide | 10 |
| Thiazole | As indicated |
| Amino-body salt | As indicated |

This rubber mix, various amino-body salts of poly-basic acids being employed in different batches in conjunction with various thiazyl sulphide accelerators, was subjected to cure for varying periods of time, after which tests were conducted for tensile strength and elongation. The following results were obtained:

| Cure in min. @260° F. | Ultimate tens. in kgs/cm² | Max. elong. in percent | Modulus in kgs/cm² | |
|---|---|---|---|---|
| | | | 500% | 700% |
| *Diphenylguanidine neutral succinate, 0.25 part; 1-mercaptobenzothiazole, 0.13 part* | | | | |
| 20 | 120 | 840 | 18 | 59 |
| 40 | 194 | 780 | 33 | 128 |
| 60 | 211 | 760 | 44 | 154 |
| 80 | 214 | 750 | 48 | 165 |
| *Diortho tolyl guanidine neutral succinate, 0.23 part; ethyl chlorocarbonate ester of 1-mercaptobenzothiazole, 0.18 part* | | | | |
| 20 | 154 | 815 | 25 | 84 |
| 40 | 184 | 740 | 39 | 146 |
| 60 | 204 | 725 | 47 | 176 |
| 80 | 206 | 710 | 53 | 196 |
| *Diphenylguanidine neutral oxalate, 0.40 part; 1-mercaptobenzothiazole, 0.13 part* | | | | |
| 20 | 124 | 765 | 24 | 85 |
| 40 | 173 | 735 | 37 | 141 |
| 60 | 172 | 700 | 47 | 172 |
| 80 | 182 | 700 | 49 | 182 |
| *Diphenylguanidine neutral sebacate, 0.20 part; 1-mercaptobenzothiazole, 0.13 part* | | | | |
| 20 | 115 | 785 | 21 | 73 |
| 40 | 150 | 735 | 33 | 124 |
| 60 | 158 | 710 | 40 | 148 |
| 80 | 176 | 725 | 41 | 155 |
| *Diphenylguanidine neutral tartrate, 0.30 part; 1-mercaptobenzothiazole, 0.13 part* | | | | |
| 20 | 116 | 755 | 24 | 84 |
| 40 | 149 | 710 | 38 | 139 |
| 60 | 167 | 715 | 42 | 154 |
| 80 | 168 | 705 | 44 | 162 |
| *Diphenylguanidine neutral succinate, 0.20 part; ethyl chloro carbonate ester of 1-mercaptobenzothiazole, 0.50 part* | | | | |
| 20 | 146 | 840 | 22 | 73 |
| 30 | 176 | 785 | 33 | 114 |
| 40 | 217 | 790 | 38 | 136 |
| 60 | 224 | 775 | 42 | 153 |
| *Diphenylguanidine neutral fumarate, 0.25 part; 1-mercaptobenzothiazole, 0.13 part* | | | | |
| 20 | 136 | 750 | 30 | 104 |
| 30 | 172 | 740 | 38 | 137 |
| 40 | 167 | 710 | 44 | 191 |
| 80 | 196 | 705 | 54 | --- |

It is noted that the employment of these amino-body salts of poly-basic organic acids gives a vulcanized rubber stock of exceptionally high quality. The stock has excellent tensile and elongation properties and has even a snappier feeling than similar stocks cured with mercaptobenzothiazole. Furthermore, a smaller amount of the mixture of accelerators is required to give the same degree of cure that a larger amount of free mercaptobenzothiazole itself would require.

Scorch tests run on various stocks employing these amino-body salts of poly-basic organic acids and similar stocks containing mercaptobenzothiazole in one instance and a mixture of mercaptobenzothiazole and diphenylguanidine in another instance show in almost every case that the employment of a mixture of a thiazyl sulphide accelerator and an amine salt of a polycarboxylic acid gives a rubber stock which is much less scorchy than a similar stock employing either mercaptobenzothiazole or a mixture of mercaptobenzothiazole and diphenylguanidine.

Other polycarboxylic organic acids which may be reacted with amino-bodies and employed in rubber in accordance with the invention are malic, saccharic, mucic, adipic, malonic, gluconic and citric acids. It will, of course, also be understood that many other amino-bodies may be employed than those specifically mentioned, examples being mono phenyl guanidine, phenyl ortho tolyl guanidine, phenyl bi-guanide, ortho tolyl bi-guanide. As previously indicated, mixed amine salts of the polycarboxylic acids may also be employed in the practice of the invention. Illustrative of such are diphenylguanidine-aniline succinate, diphenylguanidine-urea succinate, diphenylguanidine-ammonium oxalate, diphenyl guanidine ammonium succinate, diortho tolyl guanidine-aniline oxalate and the like.

Certain of the compounds also exert a favorable plasticizing action on the rubber, yielding rubber which is softer both before and after vulcanization.

Instead of the thiazyl sulphides previously mentioned as activated by the various amino-body salts of polycarboxylic acids, other mercapto thiazoles and disulfides thereof may be employed with excellent results. Examples are 1-mercapto tolyl thiazole, 4-chloro 1-mercapto benzothiazole, 5-chloro 1-mercaptobenzothiazole, 4-nitro 1-mercaptobenzothiazole, 5-nitro 1-mercaptobenzothiazole, nitro chlor 1-mercaptobenzothiazoles, and others. The polycarboxylic acid salts may also be used in admixture or in combination with esters of 1-mercaptobenzothiazoles as, for example, with the 2-4-dinitro phenyl ester, the benzoyl ester, the ethyl chloro carbonate ester or the chlor acetone ester of 1-mercaptobenzothiazole or 5-nitro 1-mercaptobenzothiazole. The thiuram disulfides and dithiocarbamates may also be employed.

Although it is believed that the reaction products of the amino-bodies and the polybasic organic acids are definite addition compounds, it will be understood that the exact constitution of the reaction products is not known with certainty.

It is also to be understood that the proportions of the thiazyl sulphide and the amino-body salt of the polycarboxylic acid best suited for any particular rubber stock will preferably be determined by experimentation, although the desired proportions will generally be in the neighborhood of those illustrated herein; also, that mixtures of thiazyl sulphides may be used with a single amino-body salt. Similarly, a mixture of amino-body salts may be employed in conjunction with a single thiazyl sulphide. It is also to be understood that in some cases the amino-body and the poly-carboxylic acid, instead of being previously reacted, may be incorporated separately in the rubber with excellent results. Alternatively, the amino-body may be previously reacted, or mixed, with the thiazyl sulphide and the acid added separately. Generally, however, it will be desirable to take care in adding the acid to the rubber as some acids are difficult to uniformly disperse in rubber and others are decomposed at the ordinary processing temperature. Again, if the rubber employed is in the form of an aqueous dispersion such as latex, it will usually be necessary to add the acid under such conditions as to prevent premature coagulation. While ordinary coagulated rubber of the *Hevea Brasiliensis* tree is preferably employed, any other material of the rubber family, such as latex, balata, gutta percha, guayule and the like, may be used in the practice of the invention.

This application is, in part, a continuation of application Serial No. 527,056, filed April 1, 1931.

It is intended that the patent shall cover by suitable expression in the appended claims whatever features of patentable novelty reside in the invention.

What I claim is:

1. A method of accelerating the vulcanization of rubber which comprises vulcanizing in the presence of an activatable organic accelerator selected from the class consisting of the mercaptothiazoles, thiuramsulphides and dithiocarbamates and the salt aryl-substituted guanidine and organic acid having the formula

wherein $n$ is a number not less than 1.

2. A method of accelerating the vulcanization of rubber which comprises vulcanizing in the presence of an activatable organic accelerator selected from the class consisting of the mercaptothiazoles, thiuramsulphides and dithiocarbamates and the salt of a polybasic organic acid having the formula

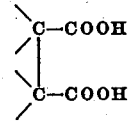

and an aryl-substituted guanidine.

3. A rubber vulcanization accelerating material containing a mercaptothiazole and an oxalate of an aryl-substituted guanidine.

4. The process of making a vulcanized rubber which consists in mixing the rubber with an activatable organic accelerator selected from the class consisting of the mercaptothiazoles, thiuramsulphides and dithiocarbamates and an oxalate of an aryl-substituted guanidine and then heating it.

5. A method of accelerating the vulcanization of rubber which comprises vulcanizing in the presence of an organic sulphur accelerator selected from the class consisting of the mercaptothiazoles, thiuramsulphides and dithiocarbamates and the salt of an aliphatic polybasic organic acid and a guanidine.

6. The method of producing vulcanized rubber and rubber-like substances which comprises adding to a rubber mix an acid salt of a diarylguanidine and a polybasic carboxylic acid and thereafter vulcanizing.

7. The method of producing vulcanized rubber which comprises adding to a rubber mix an acid guanidine salt of a polybasic carboxylic acid and thereafter vulcanizing.

WILLIAM P. TER HORST.